J. E. BUCHER.
METHOD OF OBTAINING ARGON AND RARE ATMOSPHERIC GASES.
APPLICATION FILED DEC. 15, 1913.
1,106,921.
Patented Aug. 11, 1914.
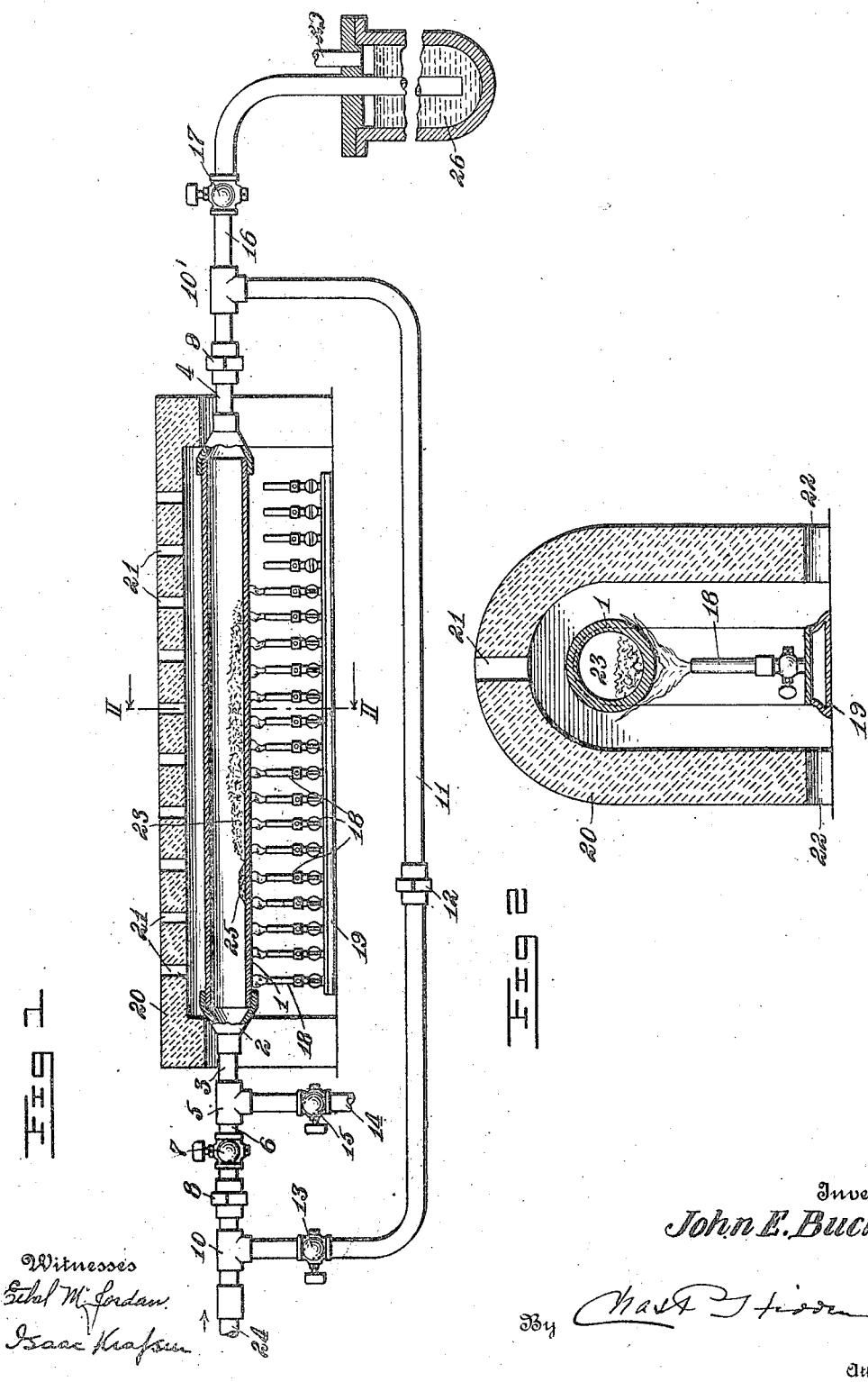
Witnesses
Ethel M. Jordan
Isaac Krafsur
Inventor
John E. Bucher
By Chas. A. Tidden
Attorney

UNITED STATES PATENT OFFICE.

JOHN E. BUCHER, OF COVENTRY, RHODE ISLAND, ASSIGNOR TO NITROGEN PRODUCTS COMPANY, OF PROVIDENCE, RHODE ISLAND, A CORPORATION OF RHODE ISLAND.

METHOD OF OBTAINING ARGON AND RARE ATMOSPHERIC GASES.

1,106,921. Specification of Letters Patent. Patented Aug. 11, 1914.

Original application filed July 24, 1912, Serial No. 711,211. Divided and this application filed December 15, 1913. Serial No. 806,717.

*To all whom it may concern:*

Be it known that I, JOHN E. BUCHER, a citizen of the United States, residing at Coventry, in the county of Kent and State of Rhode Island, have invented certain new and useful Improvements in Methods of Obtaining Argon and Rare Atmospheric Gases, of which the following is a specification.

This invention relates to the production of argon and incidentally the other rare inert atmospheric gases helium, krypton, neon and xeon, and more particularly to a process of obtaining said gases from atmospheric nitrogen.

The present application is a division of my application for United States Letters Patent relating to the synthetic production of cyanogen compounds and the like, filed in the United States Patent Office July 24, 1912, and being there designated Serial No. 711,211.

As is well known nitrogen has heretofore been regarded as a relatively inert gas while argon has, up to the present time, been found to be absolutely incapable of being united with any other element.

The present process, in its preferred form, involves the direct union of the elements forming, for example, alkali cyanids, to wit, an alkali metal, carbon and nitrogen, as a means for effecting the separation of atmospheric nitrogen from the argon.

I have endeavored in various ways to directly combine carbon free nitrogen and sodium, for example, and I find that unless a catalyzer be present the direct synthesis cannot be effected to any practicable extent. I have further found that iron is one of the most efficient catalytic agents that can be used in this connection. I have also become aware, as a result of an extensive series of experiments, that sodium carbonate may be efficiently converted into sodium cyanid and have made application for Letters Patent hereon, said application being designated Ser. No. 726,924, filed October 21, 1912 and entitled process for fixing atmospheric nitrogen.

The preferred mode of conducting my process for the production of argon, herein described merely by way of exemplification, is more particularly concerned with that phase of the problem which involves the use of metallic sodium, or the like. The latter permits the employment of relatively low temperatures, whereas with sodium carbonate, for example, a relatively high temperature is required to combine the sodium of said carbonate with free nitrogen and carbon in the presence of iron. In view of my said application No. 726,924, however, it will be obvious that in so far as the present process, relating as it does primarily to the production or separation of argon and other inert gases from atmospheric nitrogen, is concerned, it should not be regarded as being limited to the use of metallic sodium or its equivalent. It is desirable when using alkali metal, for example, in contradistinction to compounds thereof, for the economic production of alkali metal cyanids by synthesis, that oxygen, from whatever source, should be excluded from the zone in which the cyanid forming reaction occurs.

The accompanying drawing exemplifies one of many forms of apparatus in or by means of which my novel process may be effectuated. I am aware, however, that various modifications and changes may be made in both the process and apparatus, within the purview of my invention, and hence desire to be limited only by the scope of the claims appended herto.

The apparatus herein described is substantially the same as that described in my application relating to a process for purifying metals, said application having been filed in the United States Patent Office February 8, 1912, and being there designated Serial Number 676,399.

Referring to the accompanying drawing, which forms a part hereof and in which like reference characters designate like parts in the respective views, Figure 1 is a side elevation of an apparatus wherein my process may be carried out, one side of the muffle surrounding the retort being removed for purposes of illustration. Fig. 2 is a section of said apparatus taken on line 2—2 of Fig. 1.

A section of heavy weight iron pipe 1 is provided at either extremity thereof with a reducing cap 2, the reduced extremities of these pipes being respectively connected to pipes 3 and 4, the latter being preferably of considerably smaller diameter than the section 1. A T 5 is connected to the outer extremity of the small pipe or nipple 3, and a nipple 6 of the same diameter may be tapped into the opposite side of the T 5. Nipple 6 is connected to a cock 7, which in turn is connected to a coupling 8. The nipple or pipe section 4 is also correspondingly connected to a coupling 9. Two T's 10—10', one of which is disposed upon either side of the retort formed by the tube 1, are connected respectively with couplings 8 and 9 in any suitable manner, while a U-shaped pipe connection 11, having therein a coupling 12 and cock 13, afford a by-pass around the retort. Downwardly extending from the T 5 is a pipe connection 14 having therein a cock 15 and laterally extending from the T 10' is a connection 16 in which is a cock 17. The retort 1 may be heated in any suitable manner, as by means of a series of Bunsen burners 18 which for convenience may be mounted upon a common base 19 in a well known manner. A screen 20 of fire brick, or the like, preferably having substantially the form of an inverted U, may surround the retort and its burners. Suitable vents 21, for the escape of gases of combustion, and apertures 22 for the admission of air, should preferably be provided at intervals along the length of the muffle. Assuming that iron is the catalytic material used, a suitable quantity thereof may be disposed substantially in the middle of the retort, as indicated at 23. I find in practice that if the iron be finely divided, e. g., pulverulent or fibrous, the reactions are effected more rapidly than if the said metal be in larger masses. The reaction, however, may be made so vigorous as to de-carburize solid masses of steel, in which case, of course, the catalytic agent is the iron present in the steel. I have also successfully treated pig-iron herein. The catalytic metal, preferably thoroughly and intimately mixed with pulverulent carbon, e. g., graphite, so that the extended surface of the catalytic metal may be well in contact with the carbon, as hereinafter described, may be introduced into the retort by unscrewing one of the reducers 2, and I similarly introduce at one end of the retort a quantity of alkali metal, e. g., sodium. Nitrogen is introduced into the retort via a pipe 24 which is in communication with the T 10, upon the left-hand side of the device, as shown in Fig. 1; and if the cocks 7 and 17 be opened, and cocks 13 and 15 be closed, the gaseous nitrogen will pass through a coupling 8 and connected parts directly into the retort. Herein it is rapidly heated to a temperature preferably slightly above the boiling point of sodium, if that be the alkali metal used. As the hot nitrogen passes over the sodium designated 25, the latter vaporizes thereinto and passes, together with the nitrogen, through or over the catalytic metal or material 23. The carbon may also be supplied by injecting hydrocarbons, e. g. petroleum through pipe 24 together with the nitrogen; the use of such carbonaceous materials being hereinafter more fully discussed.

In the device shown, 20 burners have been somewhat diagrammatically indicated and in practice a few of these at the extremity of the retort from which the current of nitrogen emerges, are unlighted. Thus, for example, 15 gas jets may be ignited, and 5 burners may be left unlighted. As a result the said extremity of the retort from which the nitrogen emerges is cooler than other portions of the same and is preferably at a temperature below the boiling point of the alkali metal, e. g., sodium, so that any sodium which passes through the mass of catalytic material will, upon entering this relatively cool end of the retort, be deposited. This procedure results in a saving of the alkali metal which accumulates in this relatively cool extremity of the retort and is there held until the current of nitrogen is reversed, in the manner hereinafter described. The nitrogen or argon which passes out of the apparatus should preferably be quite cool, and as it passes off through the cock 17, it may be collected in any suitable manner to avoid waste. After substantially all of the sodium, if sodium be the alkali metal employed, has been transferred from one end of the retort to the other, the cocks 7 and 17 are closed and those designated 13 and 15 are opened. Thereafter the nitrogen will pass downwardly from T 10 and around a by-pass 11 to T 10', and thence through the retort 1 in a reverse direction to that in which it previously flowed therethrough. It will be understood that before so reversing the current of gas, the burners 18, which had previously been unlighted are now lighted, and a corresponding number at the other extremity of the retort are turned off. As a result, the cool section or portion of the retort is reversed from one extremity of the latter to the other, so that the previously deposited sodium, for example, will be re-evaporated and will again be carried through or over the catalytic material, by the nitrogen current, to be deposited thereafter at the end of the retort from whence it originally came. The flow of nitrogen through the retort may thus be reversed at intervals until substantially all of the alkali metal has been used up. It is obvious that this metal may be introduced into the retort or vessel either in liquid or in solid form, or it may be introduced as a vapor. My experiments indicate that the higher the temperature of the operation the more rapid the effectuation of the process. There are, however, limits beyond which it would be undesirable to go.

In operating the apparatus herein particularly described, the temperature was maintained by means of the burners at from 700° to 800° C. I have found, however, that where the iron was in finely divided condition, and where the carbon was present in proper proportion to the iron, and especially where the said carbon was in the form of graphite, the reactions took place so vigorously that some of the iron was melted into globules, which would indicate that the temperature of some of the iron had been raised to the neighborhood of 1200° C., at least. Under these last mentioned conditions, the demand for nitrogen is so great that a rapid stream of the same must be passed into the retort, as the reactions tend to form a partial vacuum therein and it is necessary in such case to guard against a flow of gas back through the cock 17. To this end a liquid seal 26, or the like, may be provided. With correct proportions of atmospheric nitrogen, carbon and sodium, in the foregoing case, and with the iron actively present greatly in excess of the active carbon present, the small quantity of gas escaping through the tube 29 was practically pure argon, substantially all of the nitrogen having been greedily absorbed. Argon may practically only be obtained, of course, from atmospheric nitrogen, and it is assumed that this latter has been obtained by separating it from the oxygen of the air by any suitable process, of which several commercially practicable ones are known to me, and which will be hereinafter referred to. Where an excess of nitrogen passes through the apparatus, it may be collected and may thus be used repeatedly until it has all been consumed. Should it be found in practice that any waste of sodium, for example, is taking place, it is merely necessary to refrigerate (as my means, for example, of currents of air) the extremity of the retort from which the nitrogen flows, to such an extent that the temperature of the same will be materially below the boiling point of the alkali metal. It may be here observed, too, that it is advantageous, in such case, to carry out the process under a pressure considerably above atmospheric. This feature is of especial advantage when the nitrogen current must be forced through the mass of catalytic material.

After many experiments and much research, I have found that carbon suitable for use in this synthetic process of producing alkali cyanids may also be obtained by heating impure carbon in the electric furnace. It is not necessary to carry the temperature in the electric furnace so high as to produce graphite. In fact, the temperature required is only that sufficient to drive off oxygen and oxygen compounds including ash. Graphite is, however, as I have previously intimated, especially available for use in the process. Many forms of lampblack also, after being heated to a white heat contain very little oxygen and are well adapted for the purpose. Carbon deposited by or obtained from the decomposition of hydrocarbons at a red heat is also admirably suited for my process. Hydrocarbon vapors, such as those obtained from petroleum oils, benzene, ($C_6H_6$) or other hydrocarbons substantially free from oxygen, may be introduced into the retort.

It is essential that an intimate mixture of or contact between the alkali metal, nitrogen, carbon, and the catalytic agent, be effected. Iron which is the preferred catalytic agent, is preferably in the form of reduced iron, powdered iron, iron filings, iron turnings, or any form of iron or steel exposing a large surface; and to such iron I broadly apply the term "finely divided." It may be here noted that it is of great importance that a relatively large quantity of the catalytic metal be provided in proportion to the quantity of carbon actively present. The carbon may be deposited upon the extended surface of the catalytic metal in a practically pure state and in an excellent physical condition for use in the process. Moreover, under suitable conditions, the carbon may be deposited in a coherent form and will cling to the surface of the iron or steel thus allowing the cyanid formed thereupon to separate from the mass in a clean condition practically free from suspended carbon. The carbon, however, may or may not be deposited previous to the introduction of the alkali metal and nitrogen, as desired. The hydrocarbon vapor may be passed over the finely divided iron or steel simultaneously with the vapor of the alkali metal and nitrogen; or, the hydrocarbon, for instance, petroleum oil, may be sprayed or injected into the apparatus with the current of nitrogen. It is not necessary to have the catalytic material e. g., iron or steel, present in finely divided condition upon which to deposit the carbon, or in contact therewith; although the formation of alkali cyanid is much more rapid when the catalytic material is in such condition as to present an extended catalytic surface to the cyanid forming element.

If the apparatus is made of steel, or if steel turnings or other finely divided forms of steel are present, the carbon of the steel is taken away by the alkali metal and nitrogen, in the form of alkali cyanid and the steel is changed to substantially pure iron. The carbon combined with the iron in steel, seems to be especially well suited to enter into combination with alkali metal and nitrogen at the proper temperature; but in any event, the presence of large amounts of finely divided iron or steel relative to the quantity of reacting substances present favors the rapid formation of alkali cyanid at a red heat. The formation of alkali cyanid, under the above named conditions, is so rapid that it is only necessary to bring a portion of the mixture of carbon, alkali metal and nitrogen into the presence of a relatively large amount of finely divided iron heated to an incipient, or very low red heat, to effect an almost immediate reaction. The catalytic agent, e. g., iron may be pulverized or fibrous and the reaction or reactions are effected with much greater rapidity under such conditions than when the catalyzer is present in solid thick masses. Of course when the carbon is combined with the catalytic element or material, as in iron carbid, the reaction effected removes the carbon from the carbid and leaves the iron to thereafter act as a true catalyzer.

The synthesis or formation of alkali cyanid being an exothermic reaction, sufficient heat is developed thereby to continue the reaction so long as the necessary elements (alkali metal, carbon and nitrogen) are supplied. The initial temperature necessary may be attained by externally heating the reaction vessel, or by heating a portion of the mixture in any desired manner to the proper temperature. On an industrial scale, if external heating be the method used, it is desirable to have the walls of the reaction vessel as thin as practicable in order to attain the necessary internal temperature as quickly and as economically as possible. Care must be taken to remove all the oxygen gas from the nitrogen used, because any oxygen entering with the nitrogen will combine with the alkali metal, thus reducing by just so much the yield of cyanid at the relatively low and economical temperature employed. The alkali metal may be sodium, potassium or lithium, or any mixture of these. Lithium, of course, produces lithium cyanid, or the like, but I prefer to use commercially pure sodium, or an alloy of sodium with a heavy metal such as lead. Lithium reacts with the elements carbon, nitrogen and iron as follows:—

$$2Li + 2C + N_2 + iron = 2LiCN + iron.$$

I have not as yet been able to ascertain whether the catalytic agent e. g., iron, is as necessary in the case of lithium as with sodium or potassium; but consider that the catalyzer is of value despite the fact that lithium forms a nitrid, $Li_3N$, which might then react with carbon to form cyanid, even in the absence of iron. I find that on heating calcium to a high temperature with nitrogen, carbon and iron, some cyanid is produced, but the quantity is in no way to be compared to that produced by the aid of the alkali metals under similar conditions. If the elements entering into the synthesis of alkali cyanids are brought together under pressure higher than ordinary atmospheric pressure, the formation of cyanid is hastened and the capacity of the apparatus is increased. If an alloy of the alkali metal, as for instance, lead-sodium alloy, to be used, the sodium may be separated from the alloy in any suitable manner as, for example, in the form of vapor, the latter being preferably obtained by blowing nitrogen through the alloy at a suitable temperature.

The nitrogen used in the process may be obtained by any suitable process; as,—from ordinary combustion gases; from liquid air; by abstracting the oxygen from atmospheric air by means of metals; as a waste product of certain chemical industries; etc. If the nitrogen is prepared from atmospheric air it will contain approximately one per cent. of argon, mixed with small quantities of other inert gases such as helium, krypton, neon and xenon, which are unchanged by the process of alkali metal cyanid synthesis; and said gases may be allowed to escape from the apparatus at a suitable point and may be collected in a suitable manner, for use in a substantially pure form.

In my co-pending application, Serial No. 676,399, filed February 8, 1912, I have considered more particularly the decarburization of steel by means of the reactions which result in the formation of cyanid or the like, both at temperatures below the melting point of iron, for example, and at temperatures above the same. I hence do not desire to be limited to a cherry red heat for the upper limit of temperature in my process, except by an express limitation in the claims, while I find that in many cases the process can be effected at a dull red heat or even somewhat lower. The temperature of the operation may in some cases range as low as 500° C., but as this temperature is approached the reaction is less vigorous and so becomes commercially impractical. On the other hand while the reaction may be effected at relatively high temperatures such for example as clear orange heat, I prefer to operate at a temperature of less than, let us say, 1100° C., owing to the difficulty and cost of operating commercially for extended periods at higher temperatures, the cost of operation including, of course, the initial cost of the apparatus used, the upkeep of the same, and the cost of fuel or electrical energy used for developing the operating temperature. Owing to the exothermic character of the reaction the reacting materials may effect an elevation of their own temperature in portions of the mass, but as far as practicable the bulk of the substances participating in the formation of the product sought are preferably maintained at a temperature between the limits stated.

As to just what reactions and inter-reactions take place resulting in the carbon present, from whatever source, uniting with the nitrogen to form the radical CN, I am unable to positively state. Apparently, an iron carbid, or, a solution of carbon in iron, is first formed, which carbid, or solution, together with the iron carbid already present, if any, then reacts with nitrogen and sodium, or like metal or element present which is capable of forming the base of a cyanogen compound which is stable at the temperature of the operation, the iron being eliminated from the compound or compounds formed, and the metallic iron thus produced being substantially pure. The solution of carbon in iron may, of course, be either in solid or molten form. The foregoing, however, is merely my theory, and I do not wish to be limited thereto in any way.

Where the word "reaction" occurs in the claims, unless qualified by the adjective "direct", or the like, I intend it to be understood that such term not only includes a simple or direct reaction but a complex reaction wherein possibly several subsidiary reactions occur; this provision being obviously necessitated by the lack of exact knowledge as to just how the molecules of the several elements involved behave with respect to each other. Where the alkali metal, for example, is used in the form of an alloy, it is still to be regarded as in the free or uncombined condition; being uncombined chemically; while this term obviously applies also to sodium or potassium vapor and the like. The term "iron" is to be regarded as of sufficient breadth to cover not only pure iron but also the iron present in cast iron, steel, or the like, since during the operation cast iron, for example, will speedily be deprived of its carbon, both combined and uncombined, and will be converted to substantially pure iron as described in my said application Serial No. 675,399; and whether the iron be in the form of pure iron and the carbon, mixed or in contact therewith, be supplied from a carbonaceous reagent such as petroleum or graphite, or whether steel or cast iron be used as the source of the catalytic metal and in part at least as the source of carbon, in either case the iron may properly be described as being intimately associated with carbon.

As previously stated, it is advisable to exclude oxygen from participation in the reaction and I also deem it desirable to, in like manner, exclude sulfur and like substances in order that the reactions involved may be as direct, and the production of the cyanogen compound as truly synthetic in character as may be commercially practicable. Finally, it should be stated that the hereindescribed process is so efficient that the yield of cyanid, for example, obtainable thereby is considerably in excess of fifty per cent. of that theoretically possible. Indeed in some cases this yield closely approximates 100%. In other words, it is possible to "fix" substantially all of the atmospheric nitrogen introduced into the apparatus and to obtain not alone the cyanogen compound sought, but also substantially pure argon as a by-product, since the quantities of helium, xenon, krypton and neon, present in the argon are practically negligible. These gases too, are, so far as is now known, absolutely inert and hence behave in the same fashion as the argon, in so far as any commercial use of this mixture of inert gases is concerned.

It is possible to quantitively combine substantially all sodium, carbon and nitrogen introduced into the apparatus, provided that proper conditions be observed and proper proportions of the constituent elements of the cyanogen compound to be formed, be provided, and the liquid cyanid may then be drained or flowed off from the residues of the reaction, or it may be removed from the iron, for example, by lixiviation or in any other desired manner. The product is quite free from sulfids, ferro-cyanids and the like when the process is properly conducted.

When the source of carbon is a hydrocarbon such as petroleum oil or benzene, as previously indicated, it is possible to operate the process very economically by utilizing the hydrogen given off from the reacting mass to obtain a fresh supply of nitrogen from the air, preparatory to repeating the cycle. Thus:

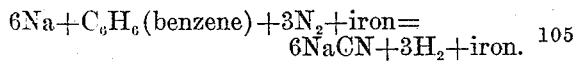

$6Na + C_6H_6 (benzene) + 3N_2 + iron = 6NaCN + 3H_2 + iron.$

This equation representing merely the result rather than the possible successive steps which may be involved. Burning the hydrogen with air, we obtain atmospheric nitrogen, the oxygen combining of course with the hydrogen to form water. The nitrogen which remains may then be utilized in the process in the manner previously described.

Having thus described my invention what I claim is:

1. A process for obtaining argon and rare atmospheric gases from the atmosphere which comprises treating air to substantially remove the oxygen content thereof and to leave substantially pure nitrogen mixed with argon, passing a current of this gaseous mixture through a heated reactive mass in which is present a finely divided catalytic material intimately associated with carbon and free alkali metal, to combine substantially all of the free nitrogen with said carbon and alkali metal, and collecting the gaseous residues of the reaction.

2. A process of obtaining argon and rare atmospheric gases which comprises subjecting atmospheric nitrogen which is substantially free from uncombined oxygen but which is still mixed with argon, to contact with an extended surface of a heated catalytic material which is intimately associated with carbon and there effecting a reaction in which participate the said carbon, nitrogen and an element capable of acting as the base of a stable cyanogen compound, to form said compound through the intermediacy of said catalytic material, and collecting the gaseous residues of said reaction.

3. A process of obtaining argon which comprises subjecting atmospheric nitrogen which is substantially free from uncombined oxygen but which is still mixed with argon, to contact with an extended surface of a heated catalytic material which is intimately associated with carbon and there effecting a reaction in which participate the said carbon, nitrogen and an initially free element capable of acting as the base of a stable cyanogen compound, to form said compound through the intermediacy of said catalytic material, and collecting the gaseous residues of said reaction.

4. A process of obtaining argon and rare atmospheric gases which comprises subjecting atmospheric nitrogen which is substantially free from uncombined oxygen but which is still mixed with argon, to contact with an extended surface of a heated catalytic material which is intimately associated with carbon and there effecting a reaction, at a temperature above 500° C. and below 1150° C., in which participate the said carbon, nitrogen and an element capable of acting as the base of a stable cyanogen compound, to form said compound through the intermediacy of said catalytic material, and collecting the gaseous residues of said reaction.

In testimony whereof I have affixed my signature, in the presence of two witnesses.

JOHN E. BUCHER.

Witnesses:
NORMAN E. HOLT,
THOMAS H. ROBERT.